US008878983B2

(12) United States Patent
Christiansen et al.

(10) Patent No.: US 8,878,983 B2
(45) Date of Patent: *Nov. 4, 2014

(54) AUTOMATIC EXPOSURE TIME SELECTION FOR IMAGING TISSUE

(75) Inventors: Jason Christiansen, Glastonbury, CT (US); Dylan M. Reilly, Middletown, CT (US); Brian Bourke-Martin, Hamden, CT (US); Mark Gustavson, Niantic, CT (US)

(73) Assignee: HistoRx, Inc., New Haven, CT (US)

( * ) Notice: Subject to any disclaimer, the term of this patent is extended or adjusted under 35 U.S.C. 154(b) by 768 days.

This patent is subject to a terminal disclaimer.

(21) Appl. No.: 13/117,789

(22) Filed: May 27, 2011

(65) Prior Publication Data
US 2011/0228993 A1    Sep. 22, 2011

Related U.S. Application Data

(63) Continuation of application No. 12/201,753, filed on Aug. 29, 2008, now Pat. No. 7,978,258.

(60) Provisional application No. 60/969,540, filed on Aug. 31, 2007.

(51) Int. Cl.
*H04N 5/238*    (2006.01)
*H04N 5/235*    (2006.01)

(52) U.S. Cl.
CPC ................... *H04N 5/2353* (2013.01)
USPC .............................. 348/364; 348/79

(58) Field of Classification Search
CPC .................................................... H04N 5/238
USPC .................... 348/79, 362, 364, 222.1, 234
See application file for complete search history.

(56) References Cited

U.S. PATENT DOCUMENTS 7,219,016 B2    5/2007  Rimm et al.
7,474,847 B2    1/2009  Nikkanen et al.
(Continued)

FOREIGN PATENT DOCUMENTS

EP    1 202 563 A1    5/2002
JP    2005-070537 A   3/2005
(Continued)

OTHER PUBLICATIONS

Butler "Enzyme-Linked Immunosorbent Assay," Journal of Immunoassay, vol. 21(2&3), 2000, pp. 165-209.
(Continued)

*Primary Examiner* — Tuan Ho
(74) *Attorney, Agent, or Firm* — Gilberto M. Villacorta; Daniel Shelton; Foley & Lardner LLP

(57) ABSTRACT

The invention relates to a system for automatically adjusting an exposure time to improve or otherwise optimize a dynamic range of a digital image. The system includes a camera configured to capture an image of a subject within the field of view at a first exposure time. The captured image is composed of multiple pixels, with each pixel having a respective intensity value. The system further includes a shutter or suitable control configured to control an exposure time of the camera. A controller configured to carryout the following steps including: (a) querying a frequency distribution of pixel intensity values; (b) determining an effective "center of mass" of such a distribution, or histogram, to determine an adjusted exposure time; and (c) capturing a second image of the subject at the adjusted exposure time thereby obtaining an image with an improved or optimal dynamic range.

25 Claims, 7 Drawing Sheets

(56) References Cited

U.S. PATENT DOCUMENTS

| | | |
|---|---|---|
| 2002/0141049 A1 | 10/2002 | Masuyama |
| 2004/0085475 A1 | 5/2004 | Skow et al. |
| 2005/0282179 A1 | 12/2005 | Martin et al. |
| 2006/0001765 A1 | 1/2006 | Suda |
| 2008/0309929 A1 | 12/2008 | Christiansen et al. |
| 2009/0034823 A1 | 2/2009 | Christiansen et al. |
| 2009/0074266 A1 | 3/2009 | Pinard et al. |
| 2009/0074282 A1 | 3/2009 | Pinard et al. |
| 2009/0086046 A1 | 4/2009 | Reilly et al. |
| 2009/0167850 A1 | 7/2009 | Bruno et al. |
| 2010/0136549 A1 | 6/2010 | Christiansen et al. |

FOREIGN PATENT DOCUMENTS

| | | |
|---|---|---|
| WO | WO-00/64147 A1 | 10/2000 |
| WO | WO-02/056584 A1 | 7/2002 |

OTHER PUBLICATIONS

Camp et al., "Quantitative Analysis of Breast Cancer Tissue Microarrays Shows That Both High and Normal Levels of HER2 Expression are Associated with Poor Outcome," Cancer Research, vol. 63, Apr. 2003, pp. 1445-1448.
Camp et al., "X-Tile: A New Bio-Informatics Tool for Biomarker Assessment and Outcome-Based Cut-Point Optimization," Clinical Cancer Research, vol. 10, 2004, pp. 7252-7259.
Camp et al., "Automated Subcellular Localization and Quantification of Protein Expression in Tissue Microarrays," New Technology—Nature Medicine, 2002, vol. 8, No. 11, pp. 1323-1327.
Dolled-Filhart et al., "Quantitive In Situ Analysis of B-Catenin Expression in Breast Cancer Shows Decreased Expression is Associated with Poor Outcome," Cancer Res., vol. 66, No. 10, 2006, pp. 5487-5494.
Elias, "Immunoshistopathology A Practical Approach to Diagnosis," American Society of Clinical Pathologists, ASCP Press, Chicago, 1990.
Giltnane et al., Technology Insight: "Identification of Biomarkers With Tissue Microarray Technology," Nature Clinical Practice Oncology, vol. 1, No. 2. (Dec. 2004), pp. 104-111.
Handbook of Fluorescent Probes and Research Products, 8th Edition, 2001.
Harvey et al., "Estrogen Receptor Status by Immunohistochemistry is Superior to the Ligand-Binding Assay for Predicting Response to Adjuvant Endocrine Therapy in Breast Cancer," Journal of Clinical Oncology, vol. 17, No. 5, 1999, pp. 1474-1481.
Jowett, "Tissue In Situ Hybridization: Methods in Animal Development," John Wiley & Sons, Inc. and Spektrum Akademischer Verlag, 1997.
Kallioniemi et al., "Tissue Microarray Technology for High-Throughput Molecular Profiling of Cancer," Human Molecular Genetics, vol. 10, No. 7, 2001, pp. 657-662.
Kononen et al., "Tissue Microarrays for High-Throughput Molecular Profiling of Tumor Specimens," Nature Medicine, vol. 4, No. 7, Jul. 1998, pp. 844-847.
Leitch, "In Situ Hybridization: A Practical Guide," Oxford BIOS Scientific Publishers, Microscopy Handbooks (1994).
Lillie, "H.J. Conn's Biological Stains: A Handbook on the Nature and Uses of the Dyes Employed in the Biological Laboratory," The Williams & Wilkins Company, copyright 1969, Eighth Edition.

McCabe et al., "Automated Quantitative Analysis (AQUA) of In Situ Protein Expression, Antibody Concentration, and Prognosis," Journal of the National Cancer Institute, vol. 97, No. 24, pp. 1808-1815, Dec. 21, 2005.
McGinty et al., "Double Immunostaining Reveals Distinctions Among Opioid Peptidergic Neurons in the Medical Basal Hypothalamus," Brain Research, vol. 278, pp. 145-153, 1983, Elsevier.
Paik et al., "Benefit from Adjuvant Trastuzumab May Not Be Confined to Patients With IHC 3 and/or FISH Positive Tumors: Central Testing Results from NSABP B-31," vol. 25, 2007, pp. 511.
Perez et al., "HER2 Testing by Local, Central, and Reference Laboratories in Specimens from the North Central Cancer Treatment Group N9831 Intergroup Adjuvant Trial", Journal of Clinical Oncology, vol. 24, 2006, pp. 3032-3038.
Raeside, et al., "Monte Carlo Principles and Application," Phs Med Biol., vol. 21, No. 2, 1976, pp. 181-197.
Rimm et al., "Tissue Microarray: A New Technology for Amplification of Tissue Resources," The Cancer Journal, vol. 7, No. 1, Jan./Feb. 2001, pp. 24-31.
Rubin et al. "Quantitative determination of expression of the prostate cancer protein alpha-methylacyl-CoA racemase using automated quantitative analysis (AQUA): A novel paradigm for automated and continuous biomarker measurements," American Journal of Pathology, vol. 164, 2004, pp. 831-840.
Sambrook et al., "Molecular Cloning, a Laboratory Manual," 1989, Cold Spring Harbor Laboratory Press, Cold Spring Harbor, N.Y., 30 pages.
Schweitzer et al. "Multiplexed protein profiling on microarrays by rolling-circle amplification," Nature Biotechnology, vol. 20, 2002, pp. 359-365.
Wolff et al., "American Society of Clinical Oncology/College of American Pathologists Guideline Recommendations for Human Epidermal Growth Factor Receptor 2 Testing in Breast Cancer," Arch Pathol Lab Med, vol. 131, Jan. 2007, p. 18-43.
Communication in EP Appln No. 09 792 559.8 dated Jan. 29, 2013.
Dell'Anna et al., "An Automated Procedure to Properly Handle Digital Images in Large Scale Tissue Micorarray Experiments", Computer Methods and Programs in Biomedicine, Elsevier, Amsterdam, NL, vol. 79, No. 3, Sep. 1, 2005, pp. 197-208.
Final Office Action mailed Mar. 5, 2013 in U.S. Appl. No. 12/560,129, 18 pages.
Gustavson, et al., Mark D., "Development of an Unsupervised Pixel-Based Clustering Algorithm for Compartmentalization of Immunohistochemical Expression Using Automated Quantitative Analysis", Applied Immunohistochemistry, vol. 17, No. 4, Jul. 1, 2009, pp. 329-337.
International Search Report and Written Opinion, PCT/US2009/056996, Jan. 25, 2010, 11 pgs.
International Search Report mailed Nov. 13, 2008 in International Appln No. PCT/US2008/074817, 3 pages.
JAIN, "Fundamentals of Digital Image Processing", Image Analysis and Computer Vision, Chapter 9, Jan. 1, 1989, p. 418.
Non-Final Office ACtion mailed Jun. 11, 2012 in U.S. Appl. No. 12/560,129, 20 pages.
Notice of Reasons for Rejection mailed Feb. 19, 2012, in Japan Appln. No. 2011-527047, with translation.
Office Action in CN Appln No. 200980137750.0 mailed Aug. 6, 2013, with translation.
Office Action in CN Appln No. 200980137750.0 dated Oct. 25, 2012.
Teverovskiy, et al.,"Automated Localization and Quantification of Protein Multiplexes Via Multispectral Fluorescence Imaging", Biomedical Imaging: From Nano to Macro, 2008, ISBI, 5th IEEE International Symposium on, IEEE, Piscataway, NJ, May 14, 2008, pp. 300-303.

Table I

| | | ER | | | PR | | |
|---|---|---|---|---|---|---|---|
| | | All | Bot 50% | Top 50% | All | Bot 50% | Top 50% |
| Single | | | | | | | |
| | Mean | 102.7 | 22.4 | 181.4 | 320.4 | 33.8 | 607.1 |
| | St. Dev. | 136.3 | 8.7 | 155.7 | 543.5 | 11.8 | 653.5 |
| | Variance | 18574 | 75.1 | 24228 | 295313 | 139.7 | 427117 |
| | Range | 812.7 | 37.1 | 775.3 | 3088.1 | 56.7 | 3030 |
| Auto | | | | | | | |
| | Mean | 141.2 | 33.6 | 248.0 | 371.7 | 41.8 | 701.1 |
| | St. Dev. | 190.0 | 11.8 | 221.4 | 633.4 | 16.5 | 765.7 |
| | Variance | 36108 | 139.9 | 49006 | 401252 | 270.9 | 586362 |
| | Range | 1018.2 | 49.5 | 967.6 | 3503.2 | 68.9 | 3462.4 |

FIG. 7

AUTOMATIC EXPOSURE TIME SELECTION FOR IMAGING TISSUE

CROSS-REFERENCE TO RELATED PATENT APPLICATIONS

This application is a continuation of U.S. patent application Ser. No. 12/201,753, filed Aug. 29, 2008, which claims priority from U.S. Provisional Application No. 60/969,540, filed Aug. 31, 2007, incorporated herein by reference in their entirety.

FIELD

The present invention relates generally to the field of imaging of biological specimens i.e., histology specimens such as tissue micro array (TMA) "histospots" and whole tissue section (WTS) fields of view (FOV) for image analysis.

BACKGROUND

Platforms for the analysis of tissue-based quantitative protein biomarker assay studies and clinical diagnostics tend to have variable results due to operator interaction. In such systems, an operation may examine histology specimens, otherwise referred to herein as samples, using a microscope system configured to capture a magnified image of the specimens. Operator decision making and setup interactions, such as those related to image capture, may lead to quantitative error in later analysis. For certain immunohistochemistry (IHC) image analysis, the magnified image is captured with a digital camera for which an exposure time for image acquisition may be set manually.

Unfortunately, such a manual methodology introduces several significant limitations. For example, the operator may select what appears to be the highest expressing fields of view of a whole tissue section, or the highest expressing histospots of a TMA to determine exposure times that are then applied to all other images acquired during a particular test. Such an approach generally limits the overall dynamic range of an assay in that optimization of image acquisition for an expression level of a single sample may be to the detriment of the other samples. Additionally, different users may determine different initial exposure times for application across samples in a particular study or different fields of view or different histospots. In either instance, such operator-dependant variability introduces possible variations even when using the same system. Still further, there is a first operator interaction time related to examination of the sample and determination of a field of view (histospots) and a second operator interaction time related to exposure time selection and performance of the actual setup. In order to realize the greatest benefit of automatically produced consistent, quantitative data on an automated IHC analysis microscopy platform, any interaction of the user with the system, including a number of operator decisions, should be kept to a minimum.

SUMMARY

The systems and processes described herein provide automatic selection of the appropriate exposure times for image acquisition using a microscope system. Such automated selection can be repeated for all channels or fluorescent signals being monitored in a fluorescence microscope based System. Alternatively or in addition, such automated selection can be repeated for all fields being examined. In some embodiments, every field of view (or histospot) examined, the camera exposure is optimized before each image is acquired with these exposure times re-optimized for each subsequent image. This procedure results in a high degree of correlation between data acquired using the processes of the invention with data acquired by a highly trained operator in manual mode.

In one aspect, the invention relates to a process for automatically optimizing a dynamic range of pixel intensity data obtained from a digital image. The process includes capturing an image of a subject within the field of view of a camera at a first exposure time, resulting in a captured image comprising a predetermined number of pixels, wherein each pixel has an intensity value. A frequency distribution of pixel intensities of the captured image is queried to determine a region of the greatest frequency occurrence of the pixel intensities of the frequency distribution. Exposure time is then adjusted from the first exposure time to shift that region of highest frequency distribution toward the middle of the range of intensity values. In other words, the center of mass of a histogram, or frequency distribution is determined from which an adjusted exposure time is calculated to achieve an optimized dynamic range of pixel intensities. A second image of the subject can then be captured at the adjusted exposure time resulting in an image having an optimal dynamic range.

Accordingly, a process for automatically improving a dynamic range of a digital image is provided, which process includes: (a) capturing a first image of a subject within the field of view of a camera at a first exposure time, resulting in a captured first image comprising a predetermined number of pixels, each pixel having an intensity value, (b) evaluating a frequency distribution of the pixel intensity values of the first image; (c) determining a region of highest frequency distribution of the histogram to determine an exposure time adjustment to shift the region of highest frequency distribution toward a center of a range of pixel intensities; in order to calculate an adjusted exposure time; and (d) capturing a second image of the subject at the adjusted exposure time thereby obtaining an image with an improved dynamic range. In a preferred process of the invention, the dynamic range is automatically improved to an optimal dynamic range. In another embodiment of the invention, the process further comprises ensuring that no more than a predetermined threshold number of the image pixel intensity values are saturated. In general, the predetermined threshold number of image pixel intensity values, which is found to be saturated, falls in the range of about 0.0% to about 0.05%. Ideally no more than about 0.02% of the image pixel intensity values are saturated.

In another embodiment, step (c), above, further comprises determining the adjusted exposure time as a function of the center of mass and a midpoint of the histogram. Preferably, the adjusted exposure time provides an image in which the center of mass of the histogram coincides with the midpoint of the histogram. Also, the process of the invention includes iteratively conducting the steps (a)-(d), above, to provide an image having an improved or optimal dynamic range. For example, conducting the steps iteratively ceases when the difference between the exposure time and the adjusted exposure time is less than a predetermined tolerance. Preferably, the number of iterations does not exceed 150 iterations, more preferably, the number of iterations does not exceed 30 iterations.

In one embodiment, the predetermined tolerance is determined by the equation: $|E/E'-1|<T$, where E is the exposure time, E' is the adjusted exposure time and T is a predetermined tolerance. In one case, for example, T may be less than 0.25. In another aspect of the invention, the disclosed process further comprises flagging or otherwise identifying an image if after iteratively improving the dynamic range, the center of mass does not coincide with the midpoint of the histogram. What is more, such flagging of the image can be used to remove it from a dataset used for further analytical evaluation. A preferred process may further comprise adjusting the exposure time to reduce the number of image pixel intensity values that are saturated by capturing a new image at one half the first exposure time. More preferably, the exposure time is adjusted iteratively until the center of mass corresponds to the midpoint of the histogram.

In another embodiment, a process is described in which the exposure time is adjusted to reduce the number of image pixel intensity values that are saturated by capturing a new image at a new exposure time that is proportionally lower than the first exposure time based on the number of saturated pixel intensity values. Once again, the exposure time can be adjusted iteratively until the center of mass corresponds to the midpoint of the histogram. The exposure time can also be adjusted to reduce the number of image pixel intensity values that are saturated by capturing a new image at a reduced, or minimum exposure time in the step of capturing an image.

While the subject of the invention may include any subject that is amenable to providing an image, particularly in the context of pharmaceutical, biological and medical research, a preferred subject includes a biological specimen, a biological tissue specimen, a whole tissue section, a tissue microarray, or combinations thereof. The subject may further include a tissue section, preferably one that has been stained, more preferably with a fluorescent substance. In one embodiment, an image is captured by the camera through a microscope. The process disclosed may also be applied to capturing a plurality of such images, such as tissue "histospots" contained in a tissue microarray.

Accordingly, a process of normalizing quantitative data across multiple slides, instruments and operators is described, which process includes: (a) capturing a first image from a first sample at a first exposure time, resulting in a captured first image comprising a predetermined number of pixels each pixel having an intensity value; (b) querying a first frequency distribution of pixel intensities values of the captured first image; to determine a center of mass of the first frequency distribution to determine a second, adjusted exposure time; (c) capturing a second image of the first sample at the second, adjusted exposure time thereby improving the dynamic range of the second image over the first image; (d) capturing a third image from a second sample at a third exposure time, resulting in a captured third image comprising a predetermined number of pixels each pixel having an intensity value; (e) querying a second frequency distribution of pixel intensities values of the captured third image to determine a center of mass of the second frequency distribution to determine a fourth, adjusted exposure time to provide a fourth image having a dynamic range corresponding to the dynamic range of the first captured image; and (h) capturing a fourth image from the second sample at the fourth, adjusted exposure time.

A computer-usable medium is also provided having computer readable instructions stored thereon for execution by a processor to perform a process for automatically adjusting the exposure time associated with a captured image, wherein the instructions comprise steps performed iteratively of: (a) capturing an image of a subject at a first exposure time, resulting in a captured image comprising a predetermined number of pixels each pixel having an intensity value; (b) querying a frequency distribution of pixel intensity values; (c) determining a center of mass of the frequency distribution of pixel intensity values to determine an adjusted exposure time; and (d) capturing a subsequent image of the subject at the adjusted exposure time thereby obtaining an image with an optimal dynamic range.

The invention also encompasses an electromagnetic signal carrying computer-readable instructions stored thereon for execution by a processor to perform a process for automatically adjusting an exposure time to optimize a dynamic range of a digital image includes: (a) capturing an image of a subject at a first exposure time, resulting in a captured image comprising a predetermined number of pixels each pixel having an intensity value; (b) querying a frequency distribution of pixel intensity values of the pixels verses intensity values; (c) determining a center of mass of the frequency distribution of pixel intensity values to determine an adjusted exposure time; and (d) capturing a second image of the subject at the adjusted exposure time thereby obtaining an image with an optimal dynamic range.

Moreover, a system is provided for automatically adjusting an exposure time to improve or optimize a dynamic range of a digital image comprising: a camera or image sensor configured to capture an image of a subject within the field of view at a first exposure time, resulting in a captured image comprising a plurality of pixels, each pixel having an intensity value; a shutter configured to control the exposure time of the camera; and a controller configured to carry out the steps comprising: (a) querying a frequency distribution or histogram of pixel intensity values of the pixels versus intensity values; (b) determining a center of mass of the histogram to determine an adjusted exposure time; and (c) capturing a second image of the subject at the adjusted exposure time thereby obtaining an image with an improved or optimal dynamic range.

Additional embodiments will become apparent to those of ordinary skill in the art from the following, additional detailed descriptions. For instance, although applied to whole tissue sections and TMA's in the examples which follow, the present technique has other potential applications. When performing quantitative analysis of digital images, the presence of saturated pixels results in an overall underestimate of intensity for both that individual pixel and its contribution to the collection of pixels being studied. Conversely, the undersaturation of an image can potentially concentrate a range of intensities within a limited number of histogram bins (as defined by the bit depth of the camera being used), thus inhibiting the discrimination of individual pixels and impacting overall dynamic range. The processes described herein provide two key features: to mitigate impact of saturated pixels and to center the image pixel intensity distribution in the dynamic range. Both of these features are critical in any situation where quantitative information is desired from an acquired image. The algorithms are wavelength independent and can be adapted to suit a range of experimental and hardware conditions (i.e., saturation thresholds, camera bit depth).

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, where emphasis is instead placed upon illustrating the principles of the invention.

FIG. 7 illustrates tabulated results of an exemplary analysis using the AutoExposure techniques described herein.

DETAILED DESCRIPTION OF THE PREFERRED EMBODIMENTS

A description of the preferred embodiments of the invention follows.

Figure 1:
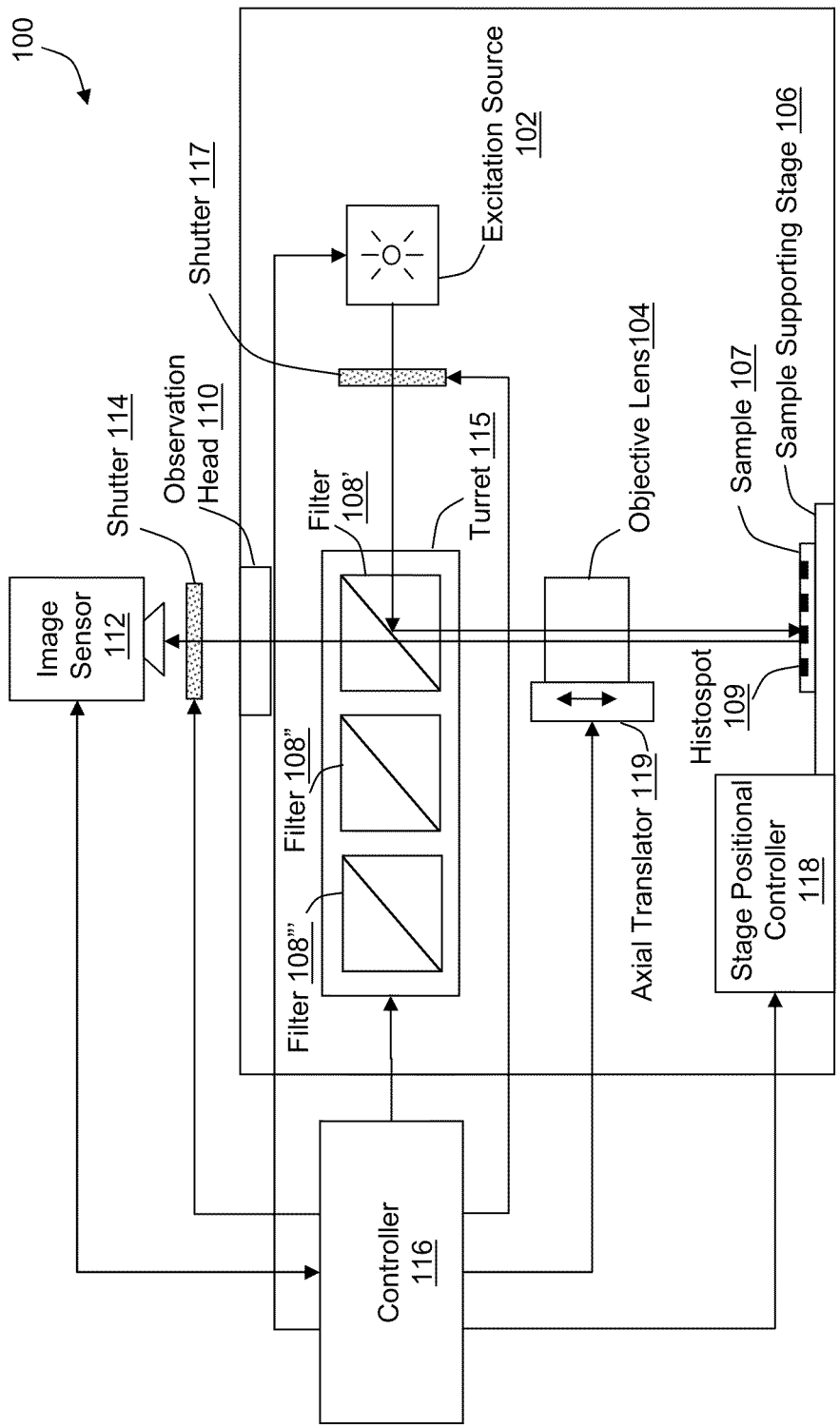
FIG. 1 illustrates a block diagram of an exemplary imaging microscope system.

Referring to FIG. 1, an exemplary reflected-light fluorescent microscope system 100 includes a an excitation source 102, an objective lens 104, a sample supporting stage 106, a filter assembly 115 including one or more filters 108', 108", 108''' (generally 108), and an observation head 110. The sample supporting stage 106 is configured to support a sample under test along an optical axis and within a focal plane of the objective lens 104. One of the filters 108 of the filter assembly 115 is also located along the optical axis between the objective lens 104 and the observation head 110. In the exemplary embodiment, each filter 108 is a three port device with two opposite ports disposed along the optical axis and a third port disposed off-axis. As illustrated, the third port can be orthogonal to a line joining the two opposite ports.

Illumination from an excitation source 102 is directed toward the orthogonal port of the filter 108. The filter 108 redirects a portion of the illumination from the excitation source 102 toward the objective lens 104. The objective lens 104 preferably includes a relatively high numerical aperture thereby allowing it to capture a substantial portion of excitation light. The objective lens 104 functions as a condenser directing excitation light toward a sample under test placed upon the stage. In some embodiments, multiple objective lenses 104 (e.g., 4×, 10×, 20×, 40×, 60×) are included within a single nosepiece (not shown). The nosepiece can be manipulated to selectively bring different ones of the multiple objective lenses 104 into alignment with the optical axis to adjust magnification of the sample under test.

Sample illumination (emission) from the sample under test travels back along the optical path through the objective lens 104 and into a first one of the opposite ports of the filter 108'. At least a portion of the sample illumination continues along the optical path, exiting a second one of the opposite ports of the filter 108' directed towards the observation head 110. As described in more detail below, the filter 108' selectively filters the sample illumination passed therethrough. In fluorescence microscopy, filtration can be used to selectively view emissions from different fluorophores (e.g., red, green, blue) used to treat the sample. As illustrated, the microscope system 100 can include multiple filters 108', 108", 108''', each filter 108 tuned to pass a selected wavelength of the sample emission toward the observation head 110. The different filter blocks 108 when housed within a carousel or turret 115, allow for rapid selection of each filter 108 without disturbing the sample under test. In some embodiments, the different filters 108 are radially disposed within the turret 115 about an axis of rotation. The turret 115 is positioned with its axis of rotation parallel and to a side of the optical axis, such that one of the filters 108' is aligned with the optical axis. Rotation of the turret 115 selectively moves one filter block 108' out of alignment and brings another one of the filter blocks 108", 108''' into alignment with the optical axis.

The observation head 110 directs at least a portion of light from the filter block 108 toward an image collection device, such as a charge coupled device (CCD) camera 112. In some embodiments, the observation head 110 additionally includes one or more eyepieces (not shown) allowing for manual observation of the sample under test. Such an eyepiece can be used to adjust placement of a sample 107 upon the stage 106 and to coordinate positioning of the stage 106 before and during test. In some embodiments, a first shutter 117 is provided to control exposure time of the sample 107 to the excitation source 102. A second shutter 114 is provided to control exposure time of an imaging device, such as the CCD camera 112. As shown, the shutter 114 can be an independent component located along the optical path between the sample under test and the observation head 110. Alternatively or in addition to an independent shutter 114, the shutter can be integrated into the CCD camera 112.

The microscope system 100 also includes a controller 116 for controlling the overall image acquisition process. Preferably, the controller 116 is in communication with one or more sub-elements of the microscope system 110 to allow automated control of the system. In the exemplary embodiment, the controller 116 is in communication with the excitation source 102, the objective lens 104, the CCD camera 112, the shutter 114, the turret 115, and a stage positional controller 118. The controller 116 can include at least one microprocessor or computer 116 operating under the control of pre-programmed instruction or code.

The pre-programmed instructions may be stored on a computer-readable medium, such as a magnetic disk (e.g., a hard disk drive), an electronic memory (e.g., a RAM), or an optical media, such as an optical disk (e.g., a CD ROM). The pre-programmed instructions can be configured to implement one or more of the procedural steps referred to herein.

In operation, the controller 116 sends a signal to the stage positional controller 118 to position the stage 106, such that a selected for or histospot 109 of the sample under test is brought into alignment with the optical axis. The controller 116 also sends a signal to an axial translator 119 configured to position and reposition the objective lens 104 along the optical axis with respect to the stage 106 bringing a magnified image of the sample into focus. For embodiments including a motorized nosepiece, the controller 116 sends a second signal to the nosepiece causing it to rotate a selected one of multiple objective lenses 104 into alignment with the optical axis prior to focusing. The controller 116 also sends a signal to the turret 115 causing a controlled rotation of the turret to select one of the multiple filters 118. In response, the turret 115 rotates, bringing the selected one of the filters 118 into alignment with the optical axis. The controller 116 next sends a signal to the excitation source 102 turning the source 102 on, at least momentarily, to illuminate the sample under test. The image sensor, or camera shutter 114 is normally closed blocking the optical path between the sample under test and the CCD camera 112. For some microscopes the light source 102 is turned on during initialization of the instrument. With fluorescent microscopes, the high-intensity lamps require a warm-up period to allow intensity of the source 102 to stabilize before any test samples are measured.

For such fluorescent systems, the light source 102 remains on during operation. The illuminated source or lamp shutter 117 between light source 102 and test sample is used to block illumination of the sample until ready to view the sample and acquire an image of the sample. Such limited exposure of the test sample to illumination may avoid bleaching of the sample. Upon receiving a first trigger signal from the controller 116, the shutter 117 opens for a predetermined exposure period before closing again. A second trigger signal from the controller is sent to the camera shutter 114. This signal controls exposure thereby allowing for a controlled sampling by the image sensor 112 of emission from the sample under test 107. In some embodiments, the first shutter 117 is open for at least the entire duration of an exposure controlled by the second shutter 114. In some embodiments, operation of the two shutters 114, 117 can be controlled by a common signal, or otherwise configured to operate in synchronization. Under control of the controller 116, the CCD camera 112 captures an electronic image of illumination from the sample under test. The image can be forwarded to the controller 116 or to an external system for analysis.

With optional independent control of the two shutters 114, 117, timing of each shutter can be varied to produce different effects. For example, in some embodiments, the first shutter 117 is opened to expose test sample for a predetermined period of time and then closed. This can be performed to expose a luminescent test sample to illumination from the source 102. The second shutter 114 could be operated after closure of the first shutter 117 to sample luminescence of the sample, without interference from source illumination.

During typical operation of the system, a microscope mounted tissue sample in either tissue micro array (TMA) or whole tissue section (WTS) format treated with immunoassay reagents and detection fluorescent histochemical stains to delineate morphological or quantitative features of the sample (i.e., regions of tumor, sub-cellular compartments and the target biomarker) is analyzed. The stained slide 107 is loaded onto the automated microscope platform 106 and multiple low magnifications images (4×) of a limited field of view are collected to generate a mosaic image of the active region of interest for analysis and determine acquisition parameters for the high resolution acquisitions. Among basic system setup parameters, the most important setup condition is the exposure time for the acquisition of an image in each channel for each filed of view required for the experiment.

In use, a test sample may include a TMA having a matrix of a tissue or cell line samples on a single microscope slide. The test sample may also be a whole tissue section, for example, from a formalin fixed, paraffin embedded sample block. Also, combinations of TMAs and whole tissue sections may be measured on the same slide.

In examples described herein, a TMA comprised of breast cancer tissue specimens with a range of expression (normal, low, medium and high) was used as a test sample for the automated exposure processes. Individual sections taken from TMAs (designated 40_7, Yale TMA facility, New Haven, Conn.) on microscope slides were put through a typical staining procedure as prescribed for quantitative AQUA® analysis.

The staining procedure comprises the following steps. Sections were deparafinized in xylene, rehydrated through a series of decreasing amounts of ethanol to pure water, and subjected to antigen retrieval in Tris EDTA. After endogenous peroxidase blocking and blocking with Background Sniper (Biocare Medical, Concord, Calif.), primary antibodies to: HER 2, polyclonal (Dako, Carpinteria, Calif.), Estrogen receptor (ER), Clone 6F11 (Novocastra, Laboratories Ltd, Burlingame, Calif.) or Progesterone Receptor (PR) Clone PgR636 (Dako) and compartment specific antibody to cytokeratin (Rabbit, Dako) each diluted in Da Vinci Green (Biocare Medical) were applied and rinsed off after one hour. Envision anti-mouse (Dako) and Alexa 555 GAR (Molecular Probes, Eugene Oreg.) were then applied. After extensive washing, TSA Cy 5 tyramide (NEN, Perkin Elmer, Waltham, Mass.) was applied. The slides were then washed in TBS/Tween 20. Finally, Prolong Gold antifade reagent with DAPI (Molecular Probes) mounting media was applied and the slides were dried.

After slides were stained, digital images for each TMA histospot were acquired on an AQUA® analysis PM-2000™ system, commercially available from HistoRx, Inc. of New Haven, Conn. Images in each relevant fluorescence channel were collected using filters for Cy5 (for ER, PR), Cy3 (for cytokeratin) and DAPI).

Software to perform image acquisition, entitled AQUASITION (version 2.0 build 2) was loaded on the PM-2000™ system. The software incorporated necessary tools for image acquisition with the feature to activate/deactivate automated exposure time calculations.

In one particular embodiment, a fluorescent microscope system is part of an integrated quantitative immunohistochemical (IHC) analysis system, such as the PM-2000™ system. The IHC analysis system comprises the following components assembled in a light-tight enclosure: a fluorescent microscope, such as the Olympus BX51 epi-fluorescence microscope, commercially available from Olympus America, Inc. of Center Valley, Pa.; the microscope is equipped with a motorized nosepiece to control selection among different objective lenses (e.g., 4×, 10×, 20×, 40×, 60×), and a motorized filter turret to control selection among different filter cube selection (e.g., in DAPI, Cy2, Cy3, Cy5 and Cy7 or equivalent wavelengths). The system also includes a motorized stage, such as the Prior Scientific part no. H101A. The PCI card that drives the stage is Prior Scientific part no. H252 motorized stage commercially available from Prior Scientific, Inc. of Rockland, Mass. The control card occupies a PCE expansion slot within a computer controller. Focus control is facilitated by integrated software. The system also includes a light source, such as the X-CITE 120 system, commercially available from EXFO Life Sciences & Industrial Division of Ontario, Canada, which is equipped with a mercury/metal halide lamp; a monochromatic digital camera for images capture, such as the QUANTIFIRE camera, commercially available from OPTRONICS of Goleta, Calif.; and a computer controller. In the exemplary embodiment, the computer is a personal computer running WINDOWS XP or higher operating system environment.

Each experimental slide or specimen was acquired first using traditional single exposure methods. Each slide was subsequently acquired using AutoExposure techniques described herein. According to a preferred embodiment, the acts of acquiring an image at optimized AutoExposure settings is performed as described in the flow chart shown in FIG. 2. An image is captured at a current exposure time in step 210. The current exposure time can be chosen as a pre-selected for each newly captured image (210). Such a preselected value can be a constant for every image. In some embodiments, the constant, pre-selected exposure time is selected to promote overexposure for the first captured image.

A distribution of the intensity values for each pixel of the captured image is queried in step 220. In some embodiments, the pixel intensity distribution is a frequency distribution. The frequency distribution can be generated for example as a histogram, in which bins of the histogram (the x-axis) correspond to different intensity values, and the y-axis corresponds to the number, or frequency, of pixels of the captured image counted in each of the different bins. For an exemplary 8-bit pixel, the histogram could be configured to have 256 bins, with each bin corresponding to a distinguishable different pixel intensity ranging from a minim value (i.e., 0) to a maximum value (i.e., 255).

A measure of the amount of pixel saturation, for example as a ratio of the number of saturated pixels to the number of total pixels, is compared to a threshold saturation value in step 230. In some embodiments, the threshold saturation value is selectable, as may be advantageous given the particular application. Saturated pixels can be identified as pixels having a maximum allowable value (e.g., an intensity value of 255 for an 8 bit pixel intensity scale of 0-255). If there are too many saturated pixels, the image may be overexposed. Beneficially, such over exposure can be corrected by reducing the exposure time and re-capturing the image using the reduced exposure time.

In some embodiments, a reduced exposure time is selected in response to determining that the captured image is overexposed. Such selection of the reduced exposure time can be determined as a function of the amount of over exposure. Alternatively or in addition, such selection of the reduced exposure time can be determined according to a selectable aggression value—more aggressive resulting in coarser steps of reduced exposure time, less aggressive resulting in finer steps. In some embodiments, the exposure time may be reduced by up to one-half of its current value based on the amount of overexposure in step 240 (this would set an upper limit to the coarseness of steps).

An image of the same sample is recaptured using the reduced exposure time at step 241. Steps 220-230 are then repeated using the new image obtained with the reduced exposure time. If the number of saturated pixels determined in step 230 is less than the predefined threshold saturation value, the image is determined as not being overexposed. If the image is not overexposed and maximization of the dynamic-range, otherwise referred to as the COM analysis herein, has not been executed, then an effective "center of mass" (COM) of the pixel distribution (or histogram when available) is found in step 250. If the COM is sufficiently close to the mid-point or center of the full range of pixel intensities (i.e., the dynamic range) then the image is saved in step 260. If the COM is not sufficiently close to the mid-point or center of the dynamic range, a corrected exposure time is determined in step 270. In at least some embodiments, the corrected exposure time is determined as a function of the distance of the COM from the mid-point or center of the possible pixel intensity frequency distribution. Then, steps 210-230 are repeated. At that point, if the image is not overexposed and the COM analysis has been executed, the image is saved in step 260. If the image is overexposed, then steps 240, 210-230 can be repeated.

AutoExposure may be a process by which the exposure time of the camera imaging tissue micro array (TMA) histospots and whole tissue section (WTS) fields of view (FOV) are adjusted automatically via a software algorithm. One aspect of the algorithm is to set the exposure time as high as possible without overexposing the image. This characteristic will produce images that have a maximized dynamic range with minimal loss of information caused by exposure time.

Figure 2:
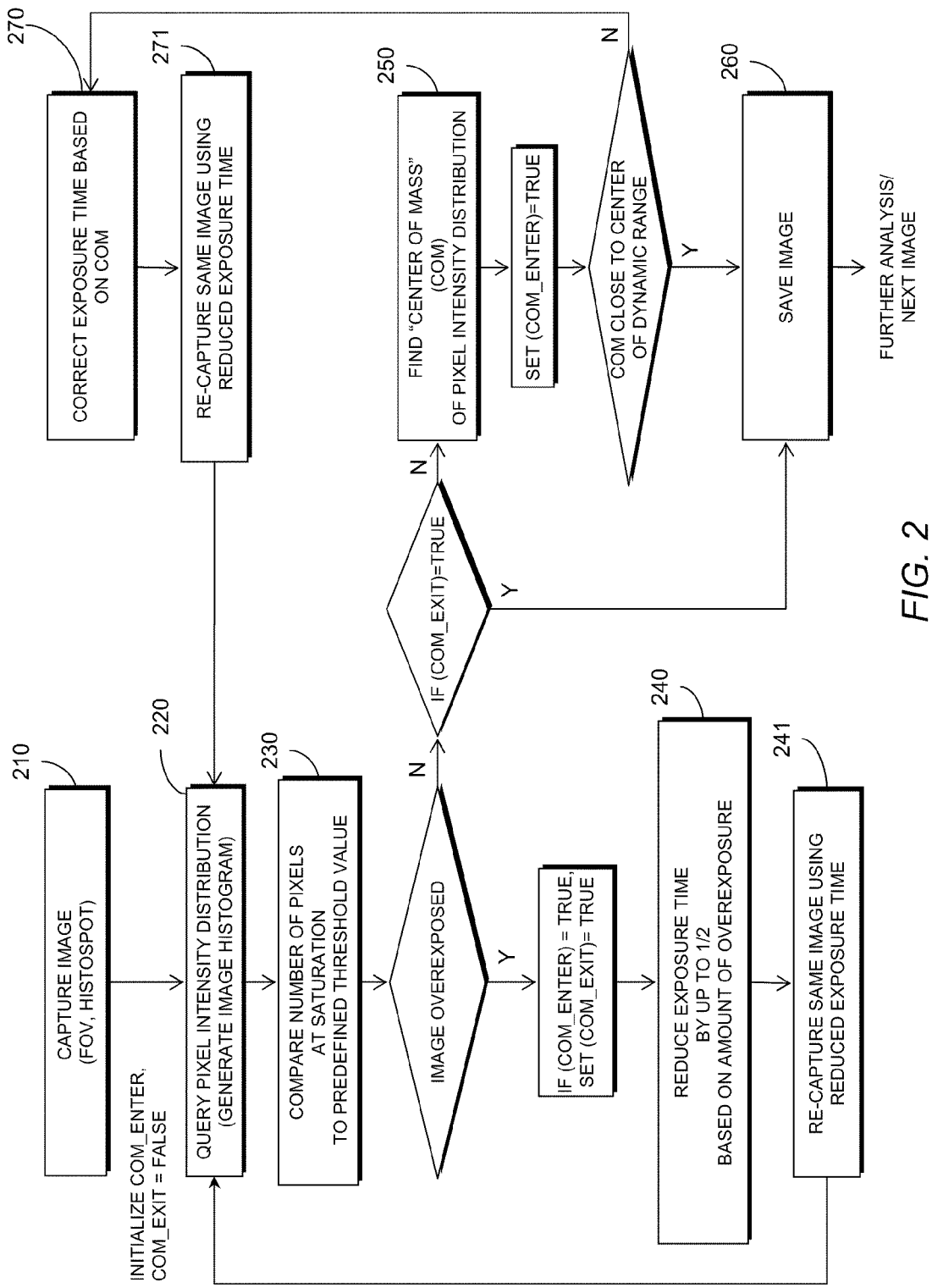
FIG. 2 illustrates a flow diagram of an embodiment of a procedure embodying the AutoExposure technique.

As shown in FIG. 2, the overall process can include multiple sub-procedures:

A first sub-procedure relates to an overexposure correction procedure. If the current exposure time results in an overexposed image, a reduce exposure time is determined to reduce and in some instances eliminate the amount of overexposure. This sub-procedure can be repeated iteratively until the image is no longer overexposed, or at least until any overexposure is below an acceptable threshold. This overexposure correction procedure yields a sample image exhibiting minimal information loss.

A second sub-procedure relates to improving a dynamic range for the tones or pixel intensities of the sample image. This sub-procedure effectively spreads or otherwise adjusts the frequency distribution of pixel intensities of the image over a wider dynamic range by moving a so-called "center of mass" (COM) of the frequency distribution towards a center of the possible range of pixel intensities thereby maximizing the dynamic range for the sample image.

Of course the "center of mass" as used herein does not literally refer to usual meaning relating to a weighted average of mass with respect to distance. Rather, the concept of a COM is used in an analogous manner referring to the pixel intensity or tonal distribution. Considering a pixel intensity histogram in which each bin is a measure of pixel intensity (tone), the bin value corresponds to a distance value within the standard meaning of COM. The bin count, or frequency, identifying the number of pixels having a particular intensity, or range of intensities, corresponds to a mass value within the standard meaning of COM. Thus, the COM of a pixel intensity distribution provides a weighted average of the number of pixels having a given intensity value (i.e., bin) versus the value of the bin. This analogy is useful in identifying that portion of the pixel intensity distribution in which a larger number of pixels of any given image can be found. It is this region having the proportionally larger number of pixels that can be moved toward a mid-point of the possible range of pixel intensities to improve the dynamic range of a given sample image.

In some embodiments a third sub-procedure, the overexposure correction procedure (i.e., the first sub-procedure) can be run again to ensure that the dynamic-range corrected image is not overexposed.

An image can be considered overexposed if a percentage of the pixels in the image have an intensity equal to the maximum resolvable intensity exceeds a predetermined threshold number, also known as the saturation limit. This predetermined threshold number may be about 0.05%, preferably, 0.02%, more preferably 0.0%.

There are various ways to correct for overexposure. One is to acquire a new image at half the exposure time of the previous image. If necessary this can be done reiteratively until saturated pixels are minimized. This allows for a quick adjustment in exposure time to bring the pixel intensities down within the range of detection to optimize exposure and dynamic range. However this simplistic approach may also cause the system to overcorrect for saturated pixels and set the new exposure time too low. Therefore it is desirable to modify the aggressiveness of the correction to the exposure time to be proportional to how many pixels are saturated in the previous image. To achieve this the new exposure time may be calculated as:

$$E = E' x(1 - (0.5)^{(1+S)}), \quad (I)$$

where $$S = A \frac{CCD_x CCD_y SL}{P} \quad (II)$$

where E is the new exposure time, E' is the currently set exposure time, A is an aggression level, SL is the saturation limit, $CCD_x$ and $CCD_y$ represent the pixel dimensions of the captured image, and P is the count of pixels at maximum intensity. The aggression level, A, may vary but, generally, the values that one would want to choose would depend upon the amount by which images tend to be over saturated. A value of zero (0) for A represents a minimum value for which the exposure time would be halved. A practical maximum value for A is about 10, after which the exposure time will not change enough for the algorithm to be useful. In a preferred embodiment of the invention, the value for A can fall in the range of about 0≤A≤4.5. More preferably, A is set at about 3.5.

The procedure of reducing exposure time to ensure the image is not overexposed is a multi-step process. In an exemplary embodiment, a 256 bin histogram is generated first for an 8-bit per pixel image obtained from the camera at the current exposure time, E'. The number of saturated pixels are identified and compared to a predetermined saturation threshold value. Then, if the image is at or below the saturation limit, the over-exposure procedure is exited. However, if the image is over exposed, the exposure time is decreased. The new, decreased exposure time can vary based upon the number of currently over exposed pixels. In an exemplary embodiment, a value S can be determined as $$S = A \frac{0.0002 \times 2048^2}{M}, \quad (1)$$

in which A is an "aggression level" currently defined at 3.5 and M is the count of pixels at maximum intensity. Then, the next exposure time E is derived as follows:

$$E = E' - E' 0.5^{1+S}.$$

When the number of over exposed pixels is much greater than the saturation limit, E≈E'−0.5E' (i.e., the exposure time would be halved). The minimum amount of change to the current exposure time occurs when the number of over saturated pixels is very nearly equal to the saturation limit, in which case E≈E'−0.088E'. Thus, because the algorithm is exited when the image is at or below the saturation limit, the number of saturated pixels will never equal the saturation limit. The procedure of reducing exposure time can be repeated in an iterative manner until the amount of overexposure is within a chosen threshold, or until a maximum number of iterations has been accomplished. In either instance the over-exposure correction routine is exited.

An alternative and equally viable process for correcting for overexposure is to acquire a new image at a minimum exposure time, then proceed with optimizing the exposure time by calculating the COM and bringing it within range of the midpoint, as described above.

There are circumstances in which it may not be possible to correct for overexposure. For example in fluorescent microscopy, various debris may be unintentionally caught in the mounted tissue sample causing unwanted, intense fluorescence, even at minimal exposure times. Application of the processes described herein are beneficial in recognizing such samples having this problem. Such samples can be flagged or otherwise identified for subsequent review, or identified as erroneous, and thus excluded from subsequent image data analysis. To achieve this the number of reiterations the system carries out can be limited. After a limited number of attempts to correct one or more of the exposure and the dynamic range, the sample can be flagged. Generally, the number of iterations x can fall in the range of about 5≤x≤150. In a preferred embodiment of the invention, the number of iterations x is set to fall in the range of about 10≤x≤30.

Dynamic Range Optimization

The following process can be implemented to optimize the dynamic range using a "center of mass" technique.

1. Capture an image of the specimen, the image made up of many pixels, each pixel having a signal intensity value.

2. Query a pixel intensity distribution of the captured image. In at least some embodiments, this step includes generation of a histogram of the image for intensity (with a full scale i.e., entire dynamic range available) versus number of pixels.

3. Calculate the center of mass (COM) of the histogram data. More generally, this step involves identification of that portion of the queried pixel intensity distribution including a relatively large number of pixels.

4. Determine an adjusted exposure time that will achieve an image with a center of mass at the midpoint of the histogram (and midpoint of dynamic range).

5. Re-acquire an image of the specimen at the adjusted exposure time.

By way of example, a 256 bin histogram is generated of an 8 bit per pixel image from the camera at the current exposure time, E'. If the image is overexposed, the algorithm is exited. The current center of mass, C, of the histogram can be determined as follows:

$$C = \frac{\sum_{i=1}^{N} i H_i}{\sum_{i=1}^{N} H_i}, \quad (3)$$

in which N is the number of histogram bins (256) and $H_i$ is the count of items in the $i^{th}$ bin. The new exposure time can be calculated by attempting to shift the current C to the center of the histogram. The value of C can be compared to a center or midpoint of the pixel intensity distribution (histogram). If the current C falls after the midpoint (N/2) of the histogram, the adjusted exposure time can be determined as follows:

$$E = \sqrt{\frac{\frac{1}{2}N}{C}} E', \quad (4)$$

otherwise, the adjusted exposure time can be determined as follows:

$$E = \sqrt{\frac{C}{\frac{1}{2}N}} E'. \quad (5)$$

If $|E/E'-1|<T$, where T is a tolerance currently set at a threshold value, such as 0.25, then exit the algorithm. The above steps in the "center of mass" technique are repeated until the difference between the exposure times is within the chosen tolerance (e.g., 0.25).

Since the above techniques can be automated, being performed by a processor, such as the controller 116 (FIG. 1), executing preprogrammed instructions to process a pixelized image of a sample, they can be executed much more quickly and reliably than if done manually by an operator. In at least some embodiments, the time savings is so substantial, that the AutoExposure process can be repeated for every FOV (histospot), while still completing analysis of a specimen within a reasonable time period. The ability to perform AutoExposure on a FOV to FOV (histospot to histospot) basis is dependent upon the expression of all pixel values in an image in terms of a measure of signal power, instead of signal value. By performing all image analyses with respect to this signal power, images with different exposure times can be normalized and data obtained from such images can be directly compared. The power P is obtained by diving the raw pixel value from the camera by the exposure time and the current bit-depth (i.e., 256 and 4096). This is an expression of the percent of maximum measurable intensity hitting a given pixel in the camera every millisecond and is given by $$P = \frac{I}{256t}, \quad (6)$$

where I is the measured pixel intensity, t is the exposure time (in milliseconds), and 256 is the bit-depth. Any bit-depth, such as 4096, can be used with no loss of generality. The resulting value has units of $ms^{-1}$. Note that this is not a classical definition of power (energy per time) because the wavelength and frequency of light captured by the camera is not considered.

In some embodiments, the overexposure correction process (e.g., steps 210 through 241 of FIG. 2) can be performed for an image without performing a COM analysis. Similarly, in some embodiments, the COM process (e.g., step 210 and steps 250-271) can be performed for an image without performing an overexposure correction process. When both overexposure and COM analyses are performed for a given image, they may be performed in either order, with one or more of the individual procedures being repeated in any sequence as may be beneficial in analyzing a specimen. Subsequent to application of the corrective techniques described herein, the adjusted image can be further analyzed using any available image analysis techniques. In at least some embodiments, further analysis includes a quantitative analysis of the sample image, such as provided by the AQUA® analysis, yielding an AQUASCORE for a given sample image.

Post Acquisition Validation

For both single exposure and AutoExposure acquired slides, each tissue spot was qualitatively assessed for focus and gross staining artifacts, followed by automated validation for split-spot images, percent tumor areas (spots with less than the 5% tumor as assessed by total pixel count were redacted), % saturation (spots with greater that 5% saturation for DAPI, 4% saturation for Cy3, and 1% saturation for Cy5 were redacted), sum-channel (total) intensities (bottom 10% for both DAPI and Cy3 were redacted) and finally, the ratio of DAPI nuclear signal to DAPI signal in cytoplasm (spots less than 1.5 were redacted). It is important to note that as a critical endpoint assessment for Auto-Exposure, no tissue spot percentage saturation exceeded the maximum of 0.02% for either array.

Data Analysis

For each validated tissue cohort, several analyses of the acquired images were done in order to assess the functionality, reproducibility, and utility of AutoExposure. Regression, distribution, and survival analysis (both Kaplan-Meier and Cox univariate) were performed using SPSS v.15.01 (SPSS, Inc; Chicago, Ill.). For survival analysis, data cutpoints were generated by a two-step cluster algorithm (SPSS) based on log-likelihood distance using Bayesian criterion as correction.

Results

Correlation Of Auto-Exposure With Single Exposure Time Setting

Figure 3A:
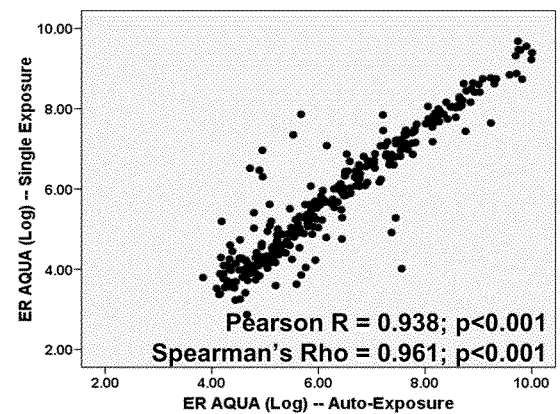
FIG. 3A through FIG. 3B illustrates regression analysis of data generated from images acquired at single exposure time (y axis) and using the AutoExposure techniques described herein (x-axis) for each of two common IHC stains.
Figure 3B:
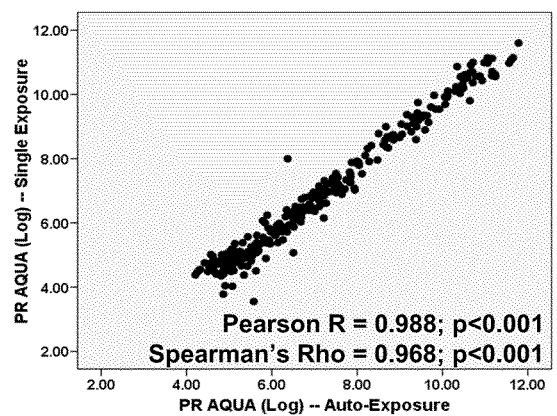

To assess how AutoExposure functions with respect to AQUA® score generation, linear and non-parametric regression analysis (FIG. 3A-FIG. 3B) was performed comparing AQUA® scores between single exposure time acquisition by an experienced operator and AutoExposure acquisition. AQUA® scores for TMA histospots stained for ER (FIG. 3A), and PR (FIG. 3B) all showed a highly significant correlation, both Pearson R and Spearman's Rho, greater than 0.9. These results indicate that, at minimum, AutoExposure functions equivalently to a trained, experienced user setting a single exposure time.

Auto-Exposure Functionality with Respect to Clinical Outcome

To confirm the above linear regression analysis and to ascertain whether AutoExposure has an affect on the data and therefore the resulting outcome prediction, an assessment was made on the overall patient survival for each of the markers tested based on data obtained using single exposure time acquisition and AutoExposure. Data cutpoints were generated by two-step clustering for each marker and exposure procedure as described above.

Figure 4A:
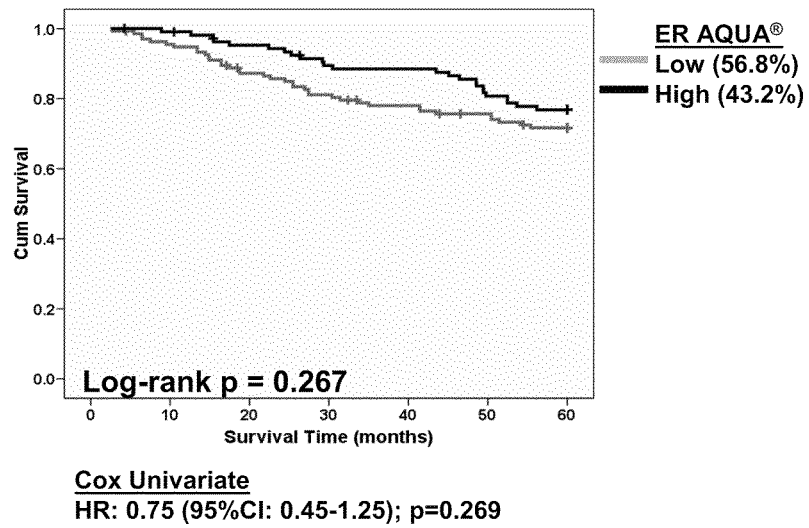
FIG. 4A and FIG. 4B illustrates clinical outcome data generated from images of ER stained specimens obtained using single exposure time (A) and the AutoExposure techniques described herein (B).
Figure 4B:
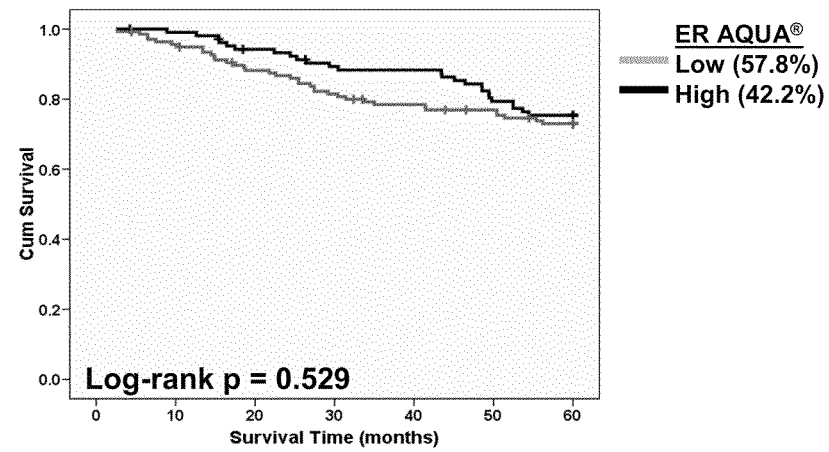
Figure 5A:
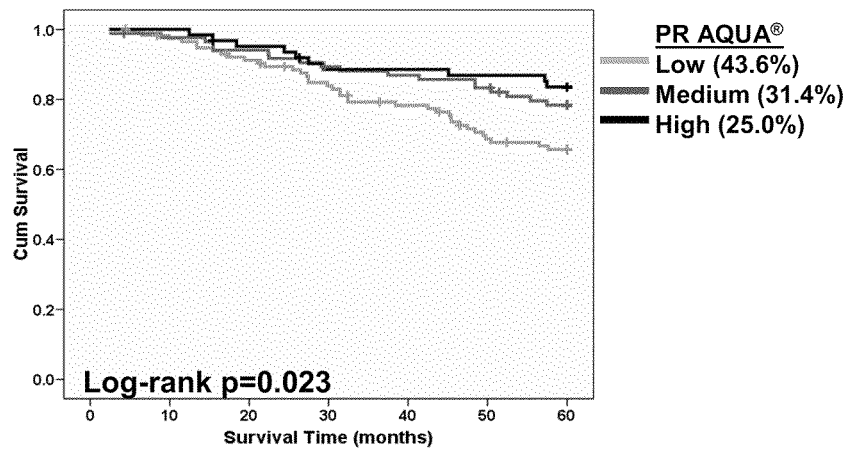
FIG. 5A and FIG. 5B illustrates clinical outcome data generated from images of PR stained specimens obtained using single exposure time (A) and the AutoExposure techniques described herein (B).
Figure 5B:
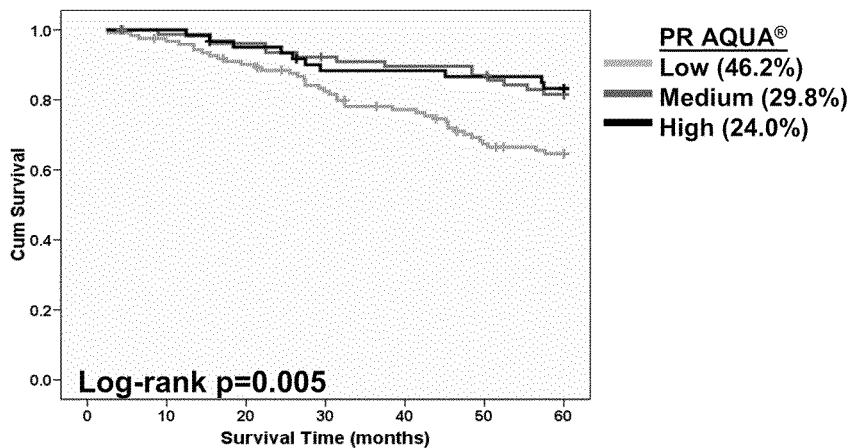

Analysis of the data for ER (FIG. 4A-FIG. 4B) showed that cluster assignments were virtually identical and survival outcome also showed the same non-significant trend for data obtained using single exposure time (FIG. 4A) and AutoExposure (FIG. 4B). Analysis of the data for PR (FIG. 5A-FIG. 5B), again showed similar cluster assignments and the resulting survival analysis revealed a significant (p=0.023 and 0.005 for single and AutoExposure respectively) association between high expression and decreased five-year disease specific survival for both single exposure time (FIG. 5A) and AutoExposure (FIG. 5B). Taken together, these data strongly support that AutoExposure is equivalent to an experienced operator setting a single exposure time manually.

Distribution Analysis

An important consideration in all immunoassays is dynamic range. To determine the affect of AutoExposure on dynamic range, a frequency distribution analysis was performed examining the mean, standard deviation, variance and range.

For data obtained from ER and PR stained samples, an increase in each of these metrics was observed as shown in Table I of FIG. 7 for 1) all samples combined, 2) samples with AQUA® scores in the lowest 50%, and 3) samples with AQUA® scores in the highest 50% with AutoExposure compared to the single-exposure time indicating AutoExposure increases the dynamic range of quantitative IHC data over that obtained using single exposure. The results demonstrated an increase in dynamic range for ER and PR quantitative assays. These data support that AutoExposure adds functionality to existing technology by expanding dynamic range.

This allows for increased resolution of quantitative IHC measurements such as AQUA® scores.

Reproducibility Of AutoExposure

Figure 6A:
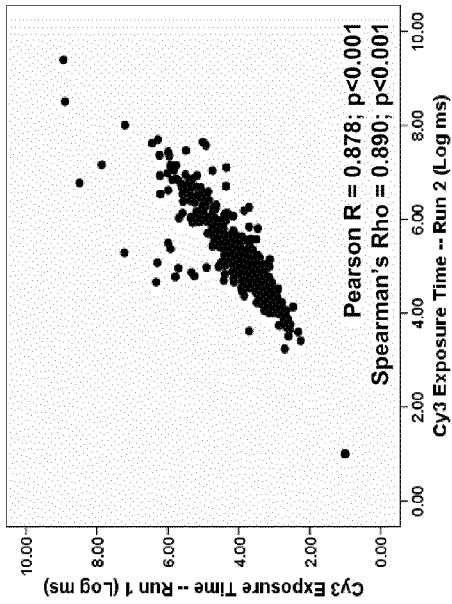
FIG. 6A through FIG. 6D illustrates regression analysis assessing reproducibility of data (AQUA® score) generated from images acquired using the AutoExposure techniques described herein (A), and the reproducibility of AutoExposure techniques described herein dictated exposure time to acquire images in the fluorescent channel for DAPI (B), Cy3 (C) and Cy5(D).
Figure 6C:
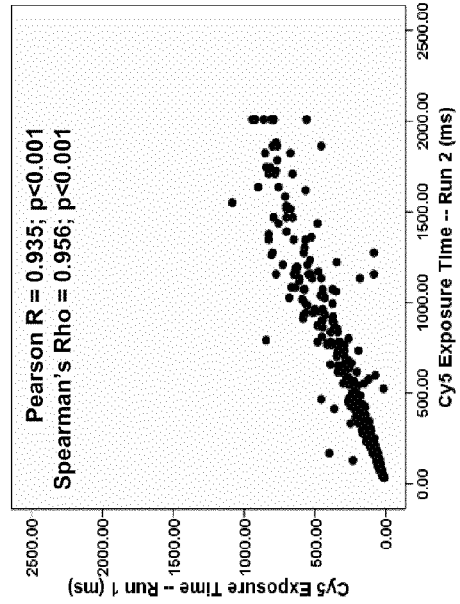
Figure 6B:
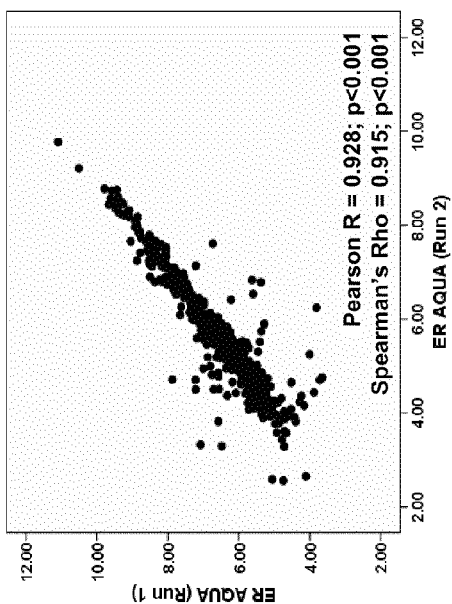
Figure 6D:
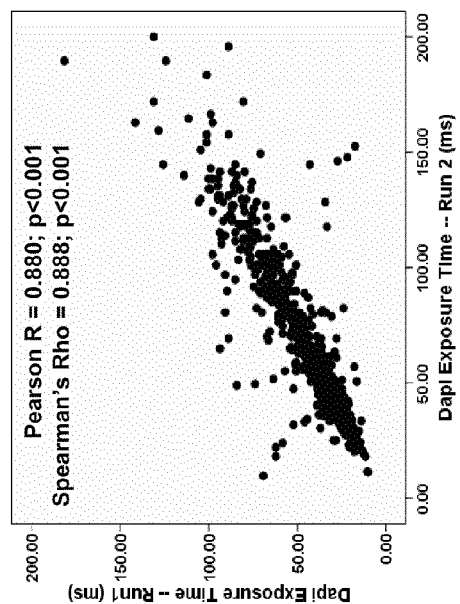

In order to test the reproducibility of AutoExposure, images of the TMA (YTMA49) stained with ER were re-acquired with AutoExposure, as previously described. FIG. 6A-FIG. 6D shows linear and non-parametric regression analysis of AQUA® scores (FIG. 6A), DAPI exposure times (FIG. 6B), Cy3 exposure time (FIG. 6C), and Cy5 exposure times (FIG. 6D). All showed significant and robust correlation. These data demonstrate, that in addition to being highly correlative with single exposure time setting, AutoExposure is highly and significantly reproducible unto itself.

As a further benefit, it was initially thought that in order to standardize the results of AQUA® analysis, machine to machine variation would need to be addressed, along with operator to operator variance and slide to slide variability, not to mention day-to-day variations in running the same assays. It was thought that assay variability could be attributed to many factors, including the inherent variations introduced by enzymatic assays, which utilize amplification steps that are affected by even slight differences in incubation time. Hence, the reproducibility of results could vary from slide to slide. It has been discovered, however, that quite surprisingly the techniques described herein do away with the need for common controls to normalize results across slides. The AutoExposure techniques described herein seem to accomplish standardization all on its own, although how it does so is not yet well understood.

While this invention has been particularly shown and described with references to preferred embodiments thereof, it should be apparent that unique operational features have been described. Although particular embodiments have been disclosed herein in detail, this has been done by way of example for purposes of illustration only, and is not intended to be limiting with respect to the scope of the appended claims which follow. In particular, it is contemplated by the inventors that various substitutions, alterations, and modifications may be made to the invention without departing from the spirit and scope of the invention encompassed by the appended claims

What is claimed is:

1. A method for automatically improving a dynamic range of pixel intensities in a digital image comprising:
   (a) capturing with a first exposure time a first image of a subject;
   (b) determining a region of a frequency distribution having a greatest frequency of occurrence of pixel intensities; and
   (c) determining an adjusted exposure time configured to move the region of the frequency distribution having the greatest frequency of occurrence toward a center of the frequency distribution when used to acquire an image of the same subject captured with the adjusted exposure time thereby obtaining an image having an improved dynamic range of pixel intensities.

2. The method of claim 1, wherein the dynamic range is automatically improved to an optimal dynamic range.

3. The method of claim 1, further comprising identifying a number of saturated pixel intensities and reducing the exposure time responsive to the number of saturated pixels being above a predetermined threshold number.

4. The method of claim 3, further comprising adjusting the exposure time to reduce the number of image pixel intensity values that are saturated by capturing a new image at one half the first exposure time.

5. The method of claim 4, wherein adjusting the exposure time is done iteratively until the region of the frequency distribution having the greatest frequency of occurrence corresponds to the center of the frequency distribution.

6. The method of claim 3, further comprising adjusting the exposure time to reduce the number of image pixel intensity values that are saturated by capturing a new image at a new exposure time that is proportionally lower than the first exposure time based on the number of saturated pixels.

7. The method of claim 6, wherein adjusting the exposure time is done iteratively until the region of the frequency distribution having the greatest frequency of occurrence corresponds to the center of the frequency distribution.

8. The method of claim 3, further comprising adjusting the exposure time to reduce the number of image pixel intensity values that are saturated by capturing a new image at a minimum exposure time in the step of capturing an image.

9. The method of claim 3, wherein the predetermined threshold number falls in the range of about 0.0% to about 0.05% of the total number of pixels in the plurality of pixels.

10. The method of claim 9, wherein the predetermined threshold number is about 0.02% the total number of pixels in the plurality of pixels.

11. The method of claim 1, wherein determining an adjusted exposure time further comprises determining the adjusted exposure time as a function of a center of mass and a midpoint of the frequency distribution of pixel intensities.

12. The method of claim 11, wherein the adjusted exposure time provides an image in which the center of mass of the frequency distribution of pixel intensities coincides with the midpoint of the frequency distribution of pixel intensities.

13. The method of claim 1, further comprising iteratively conducting the steps (a)-(c), wherein the adjusted exposure time is determined to provide an image having an improved or optimal dynamic range with each iteration.

14. The method of claim 13, wherein iteratively conducting the steps ceases when the difference between the exposure time and the adjusted exposure time is less than a predetermined tolerance.

15. The method of claim 14, wherein the number of iterations does not exceed 150 iterations.

16. The method of claim 14, wherein the number of iterations does not exceed 30 iterations.

17. The method of claim 14, wherein the predetermined tolerance is determined by the equation: $|E/E'-1|<T$, where E is the exposure time, E' is the adjusted exposure time and T is a predetermined tolerance.

18. The method of claim 17, wherein the adjusted exposure time T is less than about 0.25.

19. The method of claim 14, further comprising identifying the image if after iteratively improving the dynamic range, the center of mass does not coincide with the midpoint of the frequency distribution of pixel intensities, whereby the identified image is removed from a dataset used for further analytical evaluation.

20. The method of claim 1, wherein the image is captured by an image sensor through a microscope.

21. The method of claim 1, further comprising capturing a plurality of images, wherein each captured image has an improved dynamic range.

22. The method of claim 21, wherein the plurality of images includes tissue histospots contained in a tissue microarray.

23. The method of claim 1, wherein the pixel intensities represent signal power.

24. A non-transitory computer-readable medium having computer readable instructions stored thereon for execution by a processor, the instructions comprising steps performed iteratively of:

(a) capturing an image of a subject at a first exposure time;
(b) determining a center of mass of a frequency distribution of pixel intensity values to determine an adjusted exposure time; and
(c) capturing a subsequent image of the subject at the adjusted exposure time thereby obtaining an image with an optimal dynamic range.

25. A system for automatically adjusting an exposure time to optimize a dynamic range of a digital image comprising:
a camera configured to capture an image of a subject at a first exposure time;
a shutter configured to control the exposure time of the camera; and
a controller configured to carry out the steps comprising:
(a) determining a region of a frequency distribution having a greatest frequency of occurrence of pixel intensities; and
(b) determining an adjusted exposure time configured to move the region of the frequency distribution having the greatest frequency of occurrence toward a center of the frequency distribution when used to acquire an image of the same subject captured with the adjusted exposure time thereby obtaining an image having an improved dynamic range of pixel intensities.

* * * * *